Patented May 10, 1949

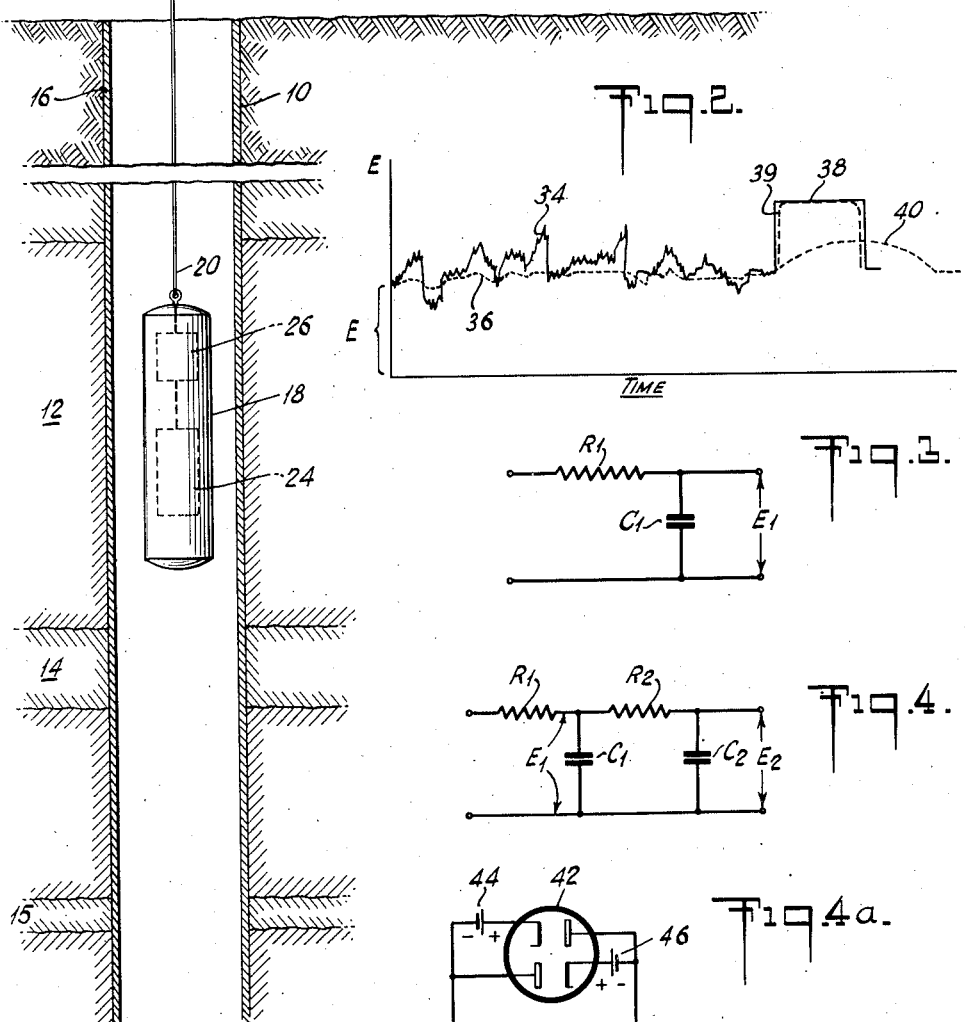

2,469,383

UNITED STATES PATENT OFFICE 2,469,383

METHOD AND APPARATUS FOR REMOVING RANDOM FLUCTUATIONS FROM INTENSITY MEASUREMENTS

Clifford Jesse Gibbs, Houston, Tex., and James Henry Stein, Garden City, N. Y., assignors to Texaco Development Corporation, New York, N. Y., a corporation of Delaware Application March 4, 1944, Serial No. 525,050

13 Claims. (Cl. 250—83.6)

This invention relates to the measuring or recording, or both, of variable intensities the true values of which are marked by random fluctuations, and more particularly to a method and apparatus for smoothing out random or statistical fluctuations which occur, for example, in the logging of formations traversed by a bore hole or well, wherein variations in the radioactivity of the formations are measured as an indication of the nature or character of the formations. Another application of the invention is in the removing of fluctuations which occur in making an electrical log (resistance log and self-potential log) of a well, and which fluctuations are due to irregularities in the contact of the electrodes with the surrounding medium and to other accidental causes. Still another application of the same idea relates to the smoothing out of irregularities in the plate current of radio tubes. Such irregularities are due to the random nature of electron emission by the cathode of the tube.

The principal object of the invention is to provide a method and a means of smoothing out a record of this kind so as to prevent confusion which might be caused by random fluctuations in the record without, however, destroying the usefulness of the record by also eliminating peaks or dips in the record which are pertinent and meaningful as indications, for instance, of the presence of underground formations having different radioactivity from the adjacent formations.

During the past few years, methods have been devised and used for determining the nature and location of underground strata by passing through a bore hole traversing said strata a radiation detector for measuring the natural radioactivity of the strata or radioactivities induced in the strata by penetrating radiation from a source inside the bore hole. The output of the detector is conducted to the surface where it is recorded, as by means of a recording galvanometer. Amplifiers may be inserted both in the well and at the surface. The record is correlated with measurements of the depth of the detector in the hole and peaks and dips in the record indicate the presence and location of strata about which information is desired.

The emission of radiation from radioactive substances is governed by purely statistical laws. For example, a radium source of one milligram radium emits on the average $7.28 \times 10^7$ gamma quanta per second. The true number of quanta emitted during each second, however, differs from the average value and the difference between the true value and the average value varies from one second to another. This difference follows the mathematical laws relating to statistical events. In the above case the most probable deviation from the average is 5700 quanta. Measurements taken for individual time intervals of one second are grouped around the average value with a probable deviation as given above. If the individual measurements were taken over intervals of four seconds each, the probable error is reduced to half or 2850 quanta; therefore, the longer the individual measurement lasts the smaller is its probable deviation from the true value.

In the same way on a continuous record along a bore hole statistical fluctuations show up as irregularities which are superimposed on the average intensity distribution. Real increases in the intensity, i. e., increases of the average intensities, appear as peaks or humps in the radioactive logs, while decreases appear as dips or valleys. A small change in the measured intensity and one which lasts only for a short period can be either due to a true change of the average value of the radioactivity or it can be caused by statistical fluctuations. Such a change may occur if the detector passes a thin formation of slightly different radioactivity from adjacent formations. The statistical fluctuations should therefore be kept smaller than the smallest true change in radioactivity one wishes to observe.

If a Geiger-Muller counter is used as a detector for the radioactivity in the formations, the intensity of the radiation is indicated by the number of current pulses which are released in the counter for a given time interval. These pulses are sent through a cable to a recorder on the surface and they may or may not be amplified within the part of the instrument that is lowered into the well and which contains the detector. The recorder could consist of a counting arrangement which registers how many pulses are arriving within a given time. It is, however, more convenient to transform the pulses into a D. C. voltage whose magnitude is indicative of the number of pulses that arrive within given time intervals. Such a circuit may be called an "integrator" and it consists essentially of an electrical condenser in series with a high resistance. Each pulse charges the condenser by the same amount and the more pulses that arrive in a given time the higher will be the voltage produced across the condenser. This voltage may or may not be amplified and then recorded photographically. The integrator provides a means for summing up the number of pulses which arrive within a certain time, this time being referred to as the "time constant" of the circuit. The voltage which corresponds to the number of pulses which arrive at the condenser within the time constant is the value which is actually recorded. Thus a time constant of one-half second averages the number of pulses which arrive in one-half second.

As was explained hereinbefore, the relative influence of statistical fluctuations becomes less if the observation time is increased, or in other words, if the time constant is increased. But if the time constant is too large the response will be sluggish and cause one to miss narrow or thin strata on passage of the detector through the hole. If, while the detector is being moved through the hole, the time constant could be reduced just at the time the detector reaches the boundary of a formation having a different radioactivity, the recorder would follow such a change immediately and the resulting record would show a sharp break in a direction depending on whether the change in radioactivity is an increase or a decrease.

In accordance with this invention means are provided for automatically reducing the time constant of the integrator whenever the change in radioactive intensity exceeds a predetermined value. The time constant is determined by the product of the resistance R and capacitance C which form the integrator; it can be reduced by reducing the value of R. This is accomplished by connecting a pair of rectifiers such as diode vacuum tubes or, if desired, a double diode, across the integrator resistance. A bucking voltage is placed in series with each rectifier and of such polarity as to prevent the rectifier from becoming conducting unless a voltage drop appears across the resistance which is greater than the bucking voltage. Whenever one of the diodes becomes conducting, it short-circuits the resistance and thereby reduces the time constant.

As long as the detector moves within a uniform stratum the number of current pulses from the detector is constant except for statistical fluctuations and therefore the voltage across the condenser of the integrator is constant within values which are determined by the statistical fluctuations. The average voltage drop across the resistance is zero and it shows changes according to the statistical fluctuation of the number of pulses. If, however, the detector moves into a formation of different radioactivity, the frequency of pulses changes and with it changes the voltage across the condenser. During the time of the change a voltage appears across the resistance and it is this voltage that governs the action of the diodes. Thus, if it is larger than the bucking voltage in series with the diode, the diode becomes conducting and the time constant is reduced. The bucking voltage has such magnitude as to prevent the diode from acting due to voltage changes across the resistor which correspond to the statistical fluctuation in the number of the pulses. Two diodes are provided so as to secure operation regardless of the polarity of the voltage across the resistor, i. e., both in the case of an increase or a decrease in the radioactivity of the formations.

In another embodiment of the invention a mechanical device smooths out the random or statistical fluctuations. In this form of the invention the mirror or a pen of the recording galvanometer is mounted on a block or frame which is supported on the arm or needle of the galvanometer by springs. The springs absorb small movements of the arm caused by random fluctuations but permit the block to follow movements indicating changes of the average intensity.

For a better understanding of the invention reference may be had to the accompanying drawing in which:

Fig. 1 is a vertical elevation through a bore hole penetrating a portion of the earth's strata;

Fig. 2 is a graph of two records, one showing statistical or random fluctuations and the other not;

Fig. 3 shows a simple resistance-capacitance circuit;

Fig. 4 shows two resistance-capacitance circuits in series;

Fig. 4a is a circuit similar to that in Fig. 4 but showing means for altering the time constant of the circuit;

Figure 5:
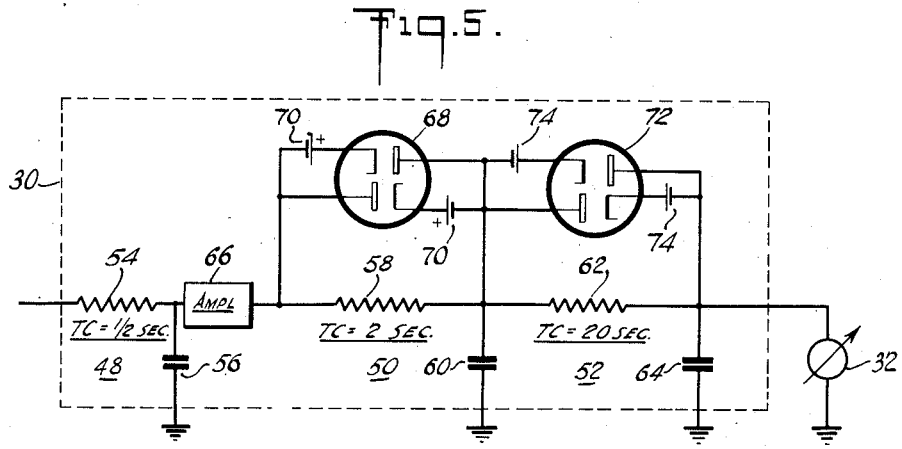
Fig. 5 is a schematic diagram of a circuit embodying the principles of the invention.

With reference to Fig. 1 of the drawing a bore hole 10 is shown as traversing several strata such, for instance, as the formations 12 and 14, the hole being provided with a casing 16. It is understood that the formations traversed by the hole 10 have a different natural radioactivity, and for purposes of this description it will be considered that the relatively narrow or thin formation 14 has higher natural radioactivity than that of the thicker formation 12. A logging instrument shown generally as a housing 18 is suspended in the hole by means of a cable 20, which cable passes over the pulley or drum of a device 22 for indicating or measuring the depth of the instrument in the hole, as is well known in this art. The instrument 18 contains a suitable gamma radiation detector 24, which may be a Geiger-Muller counter or a proportional counter, and a preamplifier 26 arranged to amplify the output of the detector. The output of the preamplifer 26 passes through the cable 20 to a suitable amplifier 28 at the surface, connected to a device 30 which will be referred to as an "integrator," the output of the integrator passing in turn to a recording instrument 32 such as a recording galvanometer.

As the instrument 18 is passed through the bore hole 10, the detector 24 responds to the radioactivity present in the various strata and electrical pulses or discharges are produced in the detector, the number of which pulses depends upon the nature, i. e., the radioactivity of the formation. As has been explained in the foregoing paragraphs, emission of radiation from radioactive substances is governed by purely statistical laws and on a continuous record along a bore hole the statistical fluctuations show up as irregularities in the intensity distribution, while any increases or decreases in the intensity appear as peaks or dips in the record. In Fig. 2 the voltage across the galvanometer is indicated by the record 34, and, assuming that this record is made while the detecting instrument is passing through a fairly thick formation such as 12 having generally a uniform radioactivity, it will be noted that while the record 34 should be substantially flat it does contain many peaks and dips which are caused by the statistical fluctuations of the radioactive decay. Records of this type are difficult to interpret and it is often impossible to determine whether or not a particular peak or dip in the record is due to statistical fluctuations or to the fact the the detector is passing a formation such as 14 in which the radioactivity is different than that of the previously traversed formation such as 12.

In order to smooth out the record so as to eliminate as far as possible the recording of the random or statistical fluctuations it is necessary to increase the time constant of the integrator. The conventional integrating circuit is shown schematically in Fig. 3. It comprises a resistance $R_1$ and a capacitance $C_1$. The voltage $E_1$ is proportional to the varying intensity and it also varies according to the random fluctuations of the intensity. The voltage $E_1$ determines the deflection of the recording galvanometer. The galvanometer may be directly connected across the condenser or, preferably, $E_1$ is amplified and is then recorded by the galvanometer. The fluctuations of $E_1$ due to the statistical fluctuations of the number of pulses depends on the size of the product $R_1 \times C_1$, which is the time constant. When $R_1C_1$ becomes larger, $E_1$ will become more steady and it will indicate an average taken over a longer interval of time. Thus to obtain a steady value of $E_1$, corresponding to the average value of the fluctuating intensity, $R_1 \times C_1$ must be made large. There is, however, a limitation to the magnitude of $R_1 \times C_1$ due to the fact that if the smoothing effect is increased the response of $E_1$ due to intensity changes becomes sluggish and if $R_1 \times C_1$ is too large $E_1$ will require so much time to change from one intensity indication to another that the system becomes impractical. In Fig. 2 the dotted line 36 indicates an output voltage such as $E_1$ and it will be noted that the record 36 is much more uniform than the record 34 since the random fluctuations have been removed by means of a resistance-capacitance circuit such as shown in Fig. 3. Assuming that the instrument 18 containing the detector 24 is lowered until the detector starts to traverse the formation 14, an ideal record should contain a break such as is shown at 38 in Fig. 2 indicating the presence of the formation 14; however, due to the sluggishness of the resistance-capacitance circuit, the record 36 will show only a slight rise or hump 40, this rise lagging considerably after the ideal peak indicated by 38. This arises from the fact that if the formation is relatively thin the time required for the detector to pass through the formation may be lesss than the time constant of the circuit; thus, the recorded intensity reaches only a fraction of its true value by the time the next change occurs. As stated above, curve 39 indicates the theoretical intensity and would be obtained, of course, if the time constant were removed during the intervals that the detector moves through the boundaries of a formation such as 14, and curve 40 indicates the result obtained if the time constant were not removed.

The lengthening of the time constant can be achieved by other means than by increasing $R_1 \times C_1$ on the circuit of Fig. 3. The left side of the circuit in Fig. 4 is a repetition of the conventional integrator as shown in Fig. 3 and it consists of $R_1$ and $C_1$. The output voltage $E_1$ is fed into a second integrator consisting of $R_2$ and $C_2$ having a time constant $R_2 \times C_2$. If $R_2 \times C_2$ is large compared with $R_1 \times C_1$, the overall time constant of the combined circuit in Fig. 4 is approximately equal $R_2 \times C_2$ and for given values of $R_1$ and $C_1$ it can be increased to any desired value by proper choice of $R_2$ and $C_2$.

Fig. 4a illustrates a device for automatically reducing the overall time constant and in this figure $R_1$, $C_1$, $R_2$ and $C_2$ correspond to the same elements in Fig. 4. A pair of vacuum tube rectifiers or, if desired, a double diode 42 is connected as shown in Fig. 4a across the resistance $R_2$. A battery 44 of, say, one to three volts is connected in series with one cathode of the double diode and the resistance $R_2$ and a similar battery 46 is connected in a like manner in series with the other cathode and the resistance $R_2$. The polarities of the batteries 44 and 46 are such as to prevent the rectifiers from becoming conducting until the voltage across $R_2$ becomes greater than the voltage of the batteries. Therefore, as long as the voltage $E_2$ minus $E_1$ is less than the bucking voltage of the batteries, the rectifiers are nonconducting and the circuit is equivalent to that of the circuit of Fig. 4. In this case, the overall time constant is large and of the order $R_2 \times C_2$. However, when the voltage $E_2$ minus $E_1$ exceeds the voltage of the batteries, one of the rectifiers becomes conducting, the specific one depending upon the polarity of the voltage of $E_2$ minus $E_1$. While the rectifier is conducting, the resistance $R_2$ is short circuited by the low resistance of the rectifier and the circuit functions like one having only a very small time constant given by $R_1 \times C_1$. This permits $E_2$ to approach rapidly to the value of $E_1$. When $E_2$ is less than the battery voltage of $E_1$, the rectifier becomes nonconducting and the second integrator is automatically restored with its large smoothing action. The voltage of the batteries 44 and 46 is made equal to the average random fluctuations in the voltage $E_1$ which it is desired to suppress. In order to have available voltages of sufficient size it is sometimes advantageous to amplify the output voltage $E_1$ of the first integrator before it is fed into the second integrator.

As stated hereinbefore the output of the preamplifier 26 is passed through the cable 20 to the amplifier 28 in which the pulses arriving at the surface are equalized both in amplitude and width. In other words, the charge of the pulses is made the same. The amplified, or rather the equalized, pulses reach the amplifier 28 and pass to the integrator 30, the circuit of which is shown diagrammatically in Fig. 5.

In Fig. 5, three resistance-capacitance circuits 48, 50 and 52 are shown in series, the product of the resistance 54 and the capacitance 56 of the circuit 48 being such as to provide a time constant of, say, one-half second. The resistance 58 and capacitance 60 of circuit 50 are such as to provide a time constant of two seconds and the resistance 62 and capacitance 64 of the third circuit 52 are such as to provide a long time constant of say 20 seconds. The voltage from first circuit 48 is amplified by means of the D. C. amplifier 66 and it is this amplified D. C. voltage which is passed on to the second smoothing or integrating circuit 50. A double diode rectifier 68 is connected around the resistance 58 in a manner already described with reference to Fig. 4a; thus, the batteries 70 are connected in series with the cathodes of the tube 68. Likewise a double diode 72 is similarly connected around the resistance 62, and batteries 74 are connected in series with the cathodes of that tube. The final output is passed to the recording device 32 which may, as above stated, be a recording galvanometer.

It is believed that the operation of the circuit shown in Fig. 5 will be clear from the foregoing description with reference particularly to Figs. 3, 4 and 4a. Assuming that the instrument 18 is being lowered through the formation 12, the radioactivity of which is substantially uniform, the pulses, or rather the output of the detector 24, will be substantially constant but a record of this output will show statistical fluctuations such as are indicated in the curve 34 of Fig. 2. However, the output of the circuit shown in Fig. 5 will be substantially flat as is indicated in the left-hand portion of the curve 36 of Fig. 2 due to the 20 second time constant of the third smoothing circuit 52. Assume that the detector 24 of the instrument 18 in its descent just reaches the boundary of the formation 14 in which the radioactivity is slightly higher than in the formation 12; the output voltage of the second circuit 50 of Fig. 5 will increase by an amount greater than the voltage of the bucking batteries 74 whereupon the resistance 62 is almost immediately shunted by the low resistance of the diode 72 and the time constant of the circuit 52 is thus rendered ineffective. With this time constant no longer effective, the record, or rather the log, should indicate a pronounced hump such as is shown at 39 in Fig. 2. When the detector leaves the formation 14 the voltage across the resistance 62 of the circuit 52 will, of course, drop back and the diode 72 again becomes non-conducting and the resistance is again in the circuit.

Assume, again, that the detector 24, still descending, reaches the upper boundary of the formation 15 in which the radioactivity is considerably higher than that of the next above formation and also let us assume that this formation is quite thin. Were the circuit 50 of Fig. 5 to remain effective with its two-second time constant, the smoothing action of this circuit might well be such as to prevent a good indication of the presence of the formation 15 on the record for reasons which have been explained. In order to obviate this the resistance 58 is shunted by the circuit of the diode 68. This diode operates in a manner similar to the diode 72, which has been described. If the output voltage of the amplifier 66 increases sharply, as it will when the detector 24 enters the formation 15, the diode 68 effectively short-circuits the resistance 58 and the time constant of two seconds is no longer in effect, giving a sharp rise of the voltage across the resistance 62 which will be short-circuited. The diode 72 will likewise operate to short-circuit the resistance 62. Both of the resistances 58 and 62 will therefore be shunted by the low resistances of the tubes 68 and 72 whereupon the time constant of the circuit 46 comes into effect and since this time constant is short, i. e., one-half second, the final output of the circuit shown in Fig. 5 will clearly provide a pronounced peak in the record or log.

It will thus be seen that a method and a circuit has been provided by means of which a long, an intermediate, or a short time constant will be used, depending upon the rate of increase or decrease in the response of the detector when it reaches formations having different radioactivity than those previously traversed. The action of cutting out the resistance 62 or the two resistances 58 and 62 is entirely automatic and provides an effective manner of securing a log in which clear indications may be found of the presence of a radioactive formation and in which statistical fluctuations will be generally suppressed while the detector is traversing formations of more or less uniform radioactivity.

Figure 6:
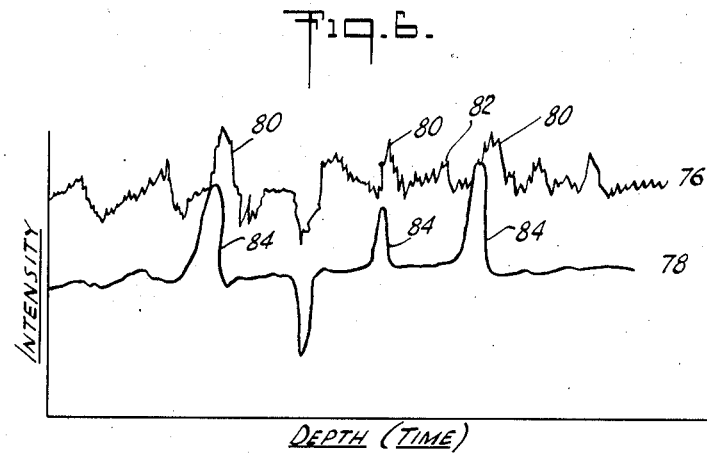
Fig. 6 shows typical records made with and without the use of the invention.

In Fig. 6 a pair of records 76 and 78 are shown, the record 76 having been made without the use of the invention, whereas the record of 78 corresponds to the record 76 but was made while using the invention. The record 76 shows peaks 80 indicating the presence of radioactive strata but this record also contains random statistical fluctuations 82, and the difficulty of interpreting the record will be apparent. On the other hand, the record 78 contains clearly defined peaks 84 corresponding to the peaks 80 of record 76, and, since the record 78 does not contain the statistical fluctuations, this record is clear and readily interpretable. Furthermore, the changes on record 78 are more abrupt and give a closer determination of the changes in the formation. The amplitude of the peaks and dips are larger and they show the true changes with better accuracy.

In another method of well logging an ionization chamber is used for detecting the intensity of radiations. The output of an ionization chamber is a D. C. current whose magnitude indicates the intensity of the radiation. Superimposed over the average value of the current are fluctuations which again are caused by the statistical nature of radioactive decay. The current set free in an ionization chamber is extremely small and it is customary to use an indirect system for transmitting it through the cable to the surface. Such system can, for example, consist in modulating the amplitude of a carrier frequency by this current, in sending the modulated current to the surface, and in separating in an amplifier 28 the D. C. component from the modulated wave. The D. C. component then energizes the recording galvanometer mostly after going through a smoothing circuit as shown in Fig. 3. Its time constant is adjusted for an optimum compromise between smoothing action or removal of statistical fluctuations and the sluggishness of response. By introducing a circuit as shown in Fig. 4a or Fig. 5 the same improvements can be obtained as were explained above for the use of a counter as radiation detector. The record has the improvement resulting from a long time constant for periods of constant average intensity and from a short time constant for changes in the average intensity.

Figure 7:
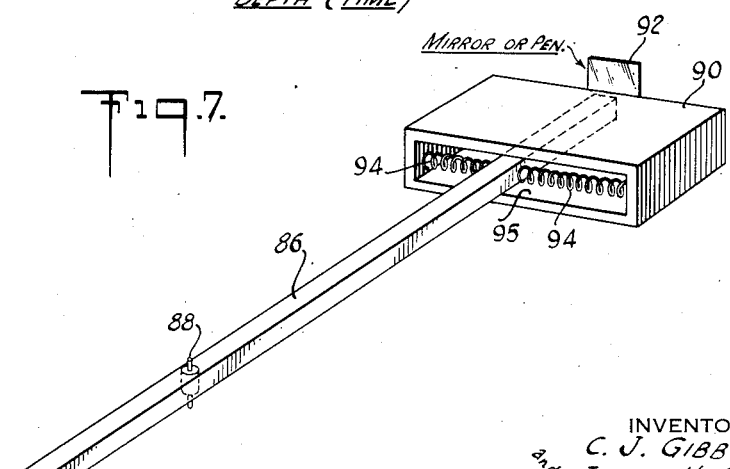
Fig. 7 is a perspective view of a mechanical device embodying the principles of the invention.

In Fig. 7 is shown a mechanical device for preventing random fluctuations from appearing in an intensity record. In this figure the arm 86 represents the indicating pointer of an instrument such as a recording galvanometer and is pivoted as is shown at 88. A frame member or hollow block 90 has affixed thereto a pen or mirror indicated diagrammatically at 92 so that movements of the frame in a direction of its longitudinal axis may be recorded either on a moving sheet of paper, not shown, or by means of a beam of light reflected from the mirror to a photo-sensitive surface such as a moving film. The frame 90 is supported from the two opposite sides of the arm 86 by means of resilient springs 94 so that slight movements or vibrations of the arm 86 will be absorbed by the resiliency of the springs without causing movement of the frame 90 which because of its inertia has resistance to movement. However, when the average intensity of the quantity to be measured increases or decreases, one of the springs will be compressed sufficiently to cause movement of the frame 90 and thus the marking or indicating device 92 so that these movements of the arm due to actual variations in the quantity to be measured will be recorded. It will be seen therefore that with reference again to Figure 6 if the marking device 92 were rigidly attached to the arm 86 a record such as 76 might be produced, this record containing random fluctuations such as 82. However with the marking device resiliently attached to the arm 86, as by means of the spring 94, the random fluctuations will be eliminated or materially smoothed out so that a record such as 78 will result. The amplitude of the fluctuations which are to be suppressed can be controlled by changing the width of the slot 95 in the frame or block 90 or by moving the block along the arm 86.

Although the invention as illustrated in Figures 1–6 is described in connection with the measuring or recording of natural radioactivity, it is to be understood that it is also applicable in measuring other forms of radioactivity such as scattered neutrons and gamma rays, as well as in the measuring or recording of other quantities—in fact, whenever a continuous indication of intensity measurements generally is desired.

Obviously many modifications and variations of the invention, as hereinbefore set forth, may be made without departing from the spirit and scope thereof, but only such limitations should be imposed as are indicated in the appended claims.

We claim:

1. In a process for continuously indicating a voltage the average value of which varies and is superimposed by random fluctuations and in which said voltage is impressed upon a resistance and a capacitance connected in series so that random fluctuations will be smoothed out, the product of said resistance and capacitance determining the time constant of the smoothing circuit, the method of adjusting said time constant so that said voltage changes will be indicated without being affected by the smoothing action of the resistance-capacitance circuit which comprises lowering the effective value of the product of said resistance and capacitance upon the occurrence of a change in the average value of said voltage.

2. In the process of measuring changes in radioactivity in which electrical pulses produced in a radiation detector by said radioactivity are integrated in a resistance-capacitance circuit, the output of which circuit varies with random fluctuations due to the statistical nature of radioactive decay, and in which process said random fluctuations are smoothed out by passing said output through a second resistance-capacitance circuit, the product of said second resistance and capacitance determining the time constant of the second circuit, the method of adjusting said time constant in accordance with changes in the intensity of radiation intercepted by said detector which comprises lowering the effective value of the product of said second resistance and capacitance so that said changes in the detector output will be recorded without being affected by the time constant of the second resistance-capacitance circuit.

3. In the process of logging a bore hole or well in which measurements are made and recorded of radiation passing to the hole from formations traversed by the hole by passing a radiation detector through the hole and integrating in a resistance-capacitance circuit electrical pulses produced in the detector, the output of which circuit varies with random fluctuations caused by the statistical nature of radioactive decay, and in which process said random fluctuations are smoothed out by passing said output through a second resistance-capacitance circuit, the time constant of which is determined by the product of said second resistance and capacitance, the method of regulating said time constant in accordance with changes in the output of said detector which comprises reducing the effective value of the product of said second resistance and capacitance so that said changes in the detector output will be recorded without being affected by the time constant of the second resistance-capacitance circuit.

4. In the process of logging a bore hole or well in which measurements are made and recorded of the natural radioactivity of the formations traversed by the hole by passing a radiation detector through the hole and integrating electrical pulses produced in the detector in a resistance-capacitance circuit, the output of which circuit varies with random fluctuations caused by the statistical nature of the radioactive decay, and in which said random fluctuations are smoothed out by passing said output through a second resistance-capacitance circuit, the product of said second resistance and capacitance determining the time constant of the second circuit, the method of adjusting said time constant in accordance with changes in the output of said detector which comprises lowering the effective value of the product of said second resistance and capacitance when the detector reaches a formation having a higher radioactivity from the previously traversed formation so that said changes in the detector output will be recorded without being affected by the time constant of the second resistance-capacitance circuit.

5. In the process of logging a bore hole or well in which measurements are made and recorded of the natural radioactivity of the formations traversed by the hole by passing a radiation detector through the hole and integrating in a resistance-capacitance circuit electrical pulses produced in the detector, the output of which circuit varies with random fluctuations caused by the statistical nature of radioactive decay, and in which process said random fluctuations are smoothed out by passing said output through a second resistance-capacitance circuit, the product of said second resistance and capacitance determining the time constant of the second circuit, the method of adjusting said time constant in accordance with changes in the output of said detector which comprises lowering the effective value of the product of said second resistance and capacitance when the detector reaches a formation having a different radioactivity from the previously traversed formation by shunting a low resistance across said second resistance so that said changes in the detector output will be recorded without being affected by the original time constant of the second resistance-capacitance circuit.

6. In the process of logging a bore hole or well in which measurements are made and recorded of the natural radioactivity of the formations traversed by the hole by passing a radiation detector through the hole and integrating in a resistance-capacitance circuit electrical pulses produced in the detector, the output of which integrating circuit varies with random fluctuations caused by the statistical nature of radioactive decay, and in which process said random fluctuations are smoothed out by passing said output through a second integrating circuit containing a resistance and a capacitance, the product of said second resistance and capacitance determining the time constant of the second integrating circuit, the method of adjusting said time constant in accordance with changes in the output of said detector which comprises reducing the effective value of the product of said second resistance and capacitance when the detector reaches a formation having a different radioactivity from the previously traversed formation by substantially short-circuiting said second resistance so that said changes in the detector output will be recorded without being affected by the time constant of the second resistance-capacitance circuit.

7. In the process of logging a bore hole or well in which measurements are made and recorded of the natural radioactivity of the formations traversed by the hole by passing a radiation detector through the hole and integrating electrical pulses produced in the detector in a resistance-capacitance circuit, the output of which circuit varies with random fluctuations caused by the statistical nature of radioactive decay, and in which said random fluctuations are smoothed out by passing said output through a second and a third resistance-capacitance circuit, the product of said second resistance and capacitance determining the time constant of the second circuit, and the product of the third resistance and capacitance determining the time constant of the third circuit, the method of adjusting said time constants in accordance with changes in the output of said detector which comprises lowering the effective value of the product of said third resistance and capacitance when the output of the second circuit changes by a predetermined amount, so that changes in the output of said second circuit will be recorded without being affected by the time constant of the third circuit, and lowering the effective value of the product of said second resistance and capacitance when the output of the first mentioned circuit changes by a predetermined amount, so that said changes in the detector output may be recorded without being affected by the time constants of either the second or the third resistance-capacitance circuit.

8. In the process of measuring changes in radioactivity in which the magnitude of an electrical current produced in a radiation detector is indicative of the intensity of radiation intercepted by the detector and in which random fluctuations superimposed on said current are smoothed out by passing the current from the detector through a resistance-capacitance circuit, the product of said resistance and capacitance determining the time constant of the circuit, the method of adjusting said time constant in accordance with changes in the intensity of radiation intercepted by said detector which comprises reducing the effective value of the product of said resistance and capacitance when a change occurs in the intensity of radiation intercepting the detector so that said changes in the detector output will be recorded without being affected by the time constant of the resistance-capacitance circuit.

9. In the process of measuring changes in radioactivity in which the magnitude of an electrical current produced in a radiation detector is indicative of the intensity of radiation intercepted by the detector and in which random fluctuations caused by the statistical nature of radioactive decay superimposed on said current are smoothed out by passing the current from the detector through a resistance-capacitance circuit, the product of said resistance and capacitance determining the time constant of the circuit, the method of adjusting said time constant in accordance with changes in the intensity of radiation intercepted by said detector which comprises reducing the effective value of the product of said resistance and capacitance by substantially short-circuiting said resistance when a change in the intensity of radiation intercepting the detector occurs, so that said changes in the detector output will be recorded without being affected by the time constant of the resistance-capacitance circuit.

10. In an electrical circuit for providing a continuous indication of intensity measurements in which a voltage varying in accordance with variations in said intensity is impressed upon a resistance and a capacitance connected in series so that random fluctuations in said voltage will be smoothed out, a measuring instrument connected across said capacitance, means for automatically lowering said resistance so that changes in said voltage may be measured without the smoothing effect of said resistance-capacitance, said means comprising a pair of rectifier tubes connected in opposition across said resistance, and a source of positive potential in series with the filament of each tube and said resistance, the arrangement being such that when said voltage changes in accordance with said intensity variations by an amount exceeding the value of said potential, said rectifiers become conducting to provide a shunt across said resistance.

11. In an electrical circuit for providing a continuous indication of a voltage the average value of which varies and is superimposed by random fluctuations, an electrical resistance and a capacitance connected in series, a measuring instrument connected across said capacitance, means for impressing said voltage upon said resistance and capacitance whereby said random fluctuations will be smoothed out, means for lowering said resistance so that changes in said voltage may be measured without the smoothing effect of said resistance-capacitance, said means comprising a pair of rectifier tubes connected in opposition across said resistance, and a source of potential connected in bucking relation in series with each tube, the arrangement being such that when said voltage changes by an amount exceeding the value of said potential, one of said rectifying tubes becomes conducting to provide a shunt across said resistance.

12. An apparatus for measuring changes in radioactivity which comprises a radiation detector in which electrical pulses are produced in accordance with the intensity of radiation intercepted by the detector, means comprising a resistance-capacitance circuit for integrating the pulse output of the detector and the output of which circuit varies with random fluctuations due to the statistical nature of radioactive decay, a second resistance-capacitance circuit through which the output of said integrating circuit is passed to smooth out random fluctuations in said output, the product of said second resistance and capacitance determining the time constant of said second circuit, means for lowering said time constant in accordance with a change in said detector output, said lowering means comprising a rectifier connected in series with a source of voltage across said second resistance so that when the output of said integrating circuit exceeds the value of said voltage, said rectifier becomes conducting to short-circuit said resistance whereby a change in the detector output caused by an increase in intercepted radiation will be measured without being affected by the time constant of said integrating circuit.

13. An apparatus for measuring changes in radioactivity which comprises a radiation detector in which electrical pulses are produced in accordance with the intensity of radiation intercepted by the detector, means comprising a resistance-capacitance circuit for integrating the pulse output of the detector and the output of which circuit varies with random fluctuations due to the statistical nature of radioactive decay, a second resistance-capacitance circuit through which the output of said integrating circuit is passed to smooth out random fluctuations in said output, the product of said second resistance and capacitance determining the time constant of said second circuit, means for lowering said time constant in accordance with a change in said detector output, said lowering means comprising a double diode vacuum tube connected across said second resistance and a source of positive potential in series with each cathode of the tube and said resistance, so that when the voltage across said resistance exceeds said potential one diode of said tube becomes conducting, depending on the polarity of said voltage, so as to reduce the value of said resistance and thereby lower said time constant so that changes in said detector output can be measured without being affected by said time constant.

CLIFFORD JESSE GIBBS.
JAMES HENRY STEIN.

REFERENCES CITED

The following references are of record in the file of this patent:

UNITED STATES PATENTS

| Number | Name | Date |
|---|---|---|
| Re. 14,585 | Arnold | Jan. 14, 1919 |
| 1,797,007 | Mann | Mar. 17, 1931 |
| 2,275,747 | Fearon | Mar. 10, 1942 |
| 2,349,225 | Scherbatskoy | May 16, 1944 |
| 2,369,138 | Cook | Feb. 13, 1945 |